US011863396B1

(12) United States Patent
Oppleman et al.

(10) Patent No.: US 11,863,396 B1
(45) Date of Patent: Jan. 2, 2024

(54) PASSIVE ASSESSMENT OF SIGNAL RELAYS AMONGST BYSTANDERS

(71) Applicant: Packet Forensics, LLC, Virginia Beach, VA (US)

(72) Inventors: Victor Oppleman, Virginia Beach, VA (US); Zachary Kanner, Virginia Beach, VA (US); Eugene Antsilevich, Oakton, VA (US)

(73) Assignee: PACKET FORENSICS, LLC, Virginia Beach, VA (US)

( * ) Notice: Subject to any disclaimer, the term of this patent is extended or adjusted under 35 U.S.C. 154(b) by 0 days.

(21) Appl. No.: 18/056,891

(22) Filed: Nov. 18, 2022

(51) Int. Cl.
*H04L 41/12* (2022.01)
*H04L 45/02* (2022.01)

(52) U.S. Cl.
CPC .............. *H04L 41/12* (2013.01); *H04L 45/02* (2013.01)

(58) Field of Classification Search
CPC ................................ H04L 41/12; H04L 45/02
See application file for complete search history.

(56) References Cited

U.S. PATENT DOCUMENTS

| | | | |
|---|---|---|---|
| 5,892,903 A | 4/1999 | Klaus | |
| 7,555,421 B1* | 6/2009 | Beckett | G06F 9/45537 703/23 |
| 8,516,586 B1 | 8/2013 | Jensen et al. | |
| 8,547,974 B1 | 10/2013 | Guruswamy et al. | |
| 2009/0031420 A1 | 1/2009 | Lloyd et al. | |
| 2015/0120826 A1* | 4/2015 | Gauweiler | H04L 67/104 709/204 |
| 2018/0130092 A1* | 5/2018 | Nahass | A63F 13/49 |
| 2018/0376416 A1* | 12/2018 | Khanna | H04W 84/18 |
| 2021/0160281 A1 | 5/2021 | Hallaji et al. | |
| 2021/0344726 A1 | 11/2021 | Mehr | |

FOREIGN PATENT DOCUMENTS

WO 2017053806 A1 3/2017

OTHER PUBLICATIONS

Combined Search and Examination Report uder Sections 17 & 18(3) issued in United Kingdom Patent Application No. 2304885.3 dated Sep. 29, 2023, 2 pages.

* cited by examiner

*Primary Examiner* — Chi H Pham
*Assistant Examiner* — Raul Rivas
(74) *Attorney, Agent, or Firm* — MH2 TECHNOLOGY LAW GROUP, LLP (57) ABSTRACT

Techniques for discovering a network using a sensor installed in the network, where the network is communicatively coupled to an external network by a router, are presented. The techniques can include: determining, automatically and by the sensor, a network address of the router; detecting, automatically and by the sensor, a network address of a client in the network; assessing, automatically and by the sensor, that the client in the network is actively communicating on the network; communicating, by the sensor, with the network address of the router; and participating, by the sensor, in communications on the network by emulating the network address of the client and by using the network address of the router.

24 Claims, 5 Drawing Sheets

PASSIVE ASSESSMENT OF SIGNAL RELAYS AMONGST BYSTANDERS

FIELD

This disclosure relates generally to digital network communications.

BACKGROUND

As digital communication networks evolve, so do the security threats to which these networks are potentially exposed. As these threats grow in terms of numbers and sophistication, there is a greater need to detect, manage, and observe adversarial activities. More advanced threats may require more advanced detection capabilities. Existing overt threat detection techniques that do not conceal their presence can be detected by malicious actors, which may take corresponding detection avoidance actions.

SUMMARY

According to various embodiments, a method of discovering a network using a sensor installed in the network, where the network is communicatively coupled to an external network by a router, is presented. The method includes: determining, automatically and by the sensor, a network address of the router; detecting, automatically and by the sensor, a network address of a client in the network; assessing, automatically and by the sensor, that the client in the network is actively communicating on the network; communicating, by the sensor, with the network address of the router; and participating, by the sensor, in communications on the network by emulating the network address of the client and by using the network address of the router.

Various optional features of the above method embodiments include the following. The sensor may be installed in-line with the router. The method may further include: reassessing automatically, subsequent to the assessing, whether the client in the network is actively communicating on the network, wherein the reassessing comprises determining that the client in the network is no longer actively communicating on the network; assessing that a second client in the network is actively communicating on the network; and participating, by the sensor, in communications on the network by emulating a network address of the second client. The method may further include: assessing that a plurality of additional clients in the network are actively communicating on the network, wherein the plurality of additional clients comprises the second client; ranking the plurality of additional clients based on at least one of: number of devices in the network in communication, number of devices outside of the network in communication, frequency of communications outside of the network, or volume of communications outside of the network; and selecting the second client from among the plurality of additional clients based on the ranking. The participating, by the sensor, in communications on the network by emulating a network address of the second client may include sending a communication to a destination in the external network, and the method may further include delaying the sending the communication to the destination in the external network until after the assessing that a second client in the network is actively communicating on the network. The method may further include reevaluating automatically, subsequent to the determining, a network address of the router. A server may be connected to the external network, and the participating in communications on the network may include receiving, by the sensor, instructions sent to the network address of the client from the server via the network address of the router. The instructions may include a code update for the sensor. The participating in communications on the network may include monitoring data in transit on the network. A server may be connected to the external network, and the participating in communications on the network may further include sending the data from the network address of the client to the server via the network address of the router. The participating in communications on the network may include filtering content on the network. The participating in communications on the network may include modifying content in transit on the network. The participating in communications on the network may include inserting content in transit on the network. The method may include identifying an addressing scheme used by the network. The determining, automatically and by the sensor, the network address of the router, may include: determining that a packet originating in the network is addressed to a destination in the external network; and extracting a Media Access Control (MAC) address from the packet.

According to various embodiments, a sensor for discovering a network when installed in the network, where the network is communicatively coupled to an external network by a router, is presented. The sensor includes an electronic processor and persistent storage including instructions that, when executed by the processor, cause the sensor to perform actions including: determining, automatically and by the sensor, a network address of the router; detecting, automatically and by the sensor, a network address of a client in the network; assessing, automatically and by the sensor, that the client in the network is actively communicating on the network; communicating, by the sensor, with the network address of the router; and participating, by the sensor, in communications on the network by emulating the network address of the client and by using the network address of the router.

Various optional features of the above embodiments include the following. The sensor may be installed in-line with the router. The actions may further include: reassessing automatically, subsequent to the assessing, whether the client in the network is actively communicating on the network, wherein the reassessing comprises determining that the client in the network is no longer actively communicating on the network; assessing that a second client in the network is actively communicating on the network; and participating, by the sensor, in communications on the network by emulating a network address of the second client. The actions may further include: assessing that a plurality of additional clients in the network are actively communicating on the network, wherein the plurality of additional clients comprises the second client; ranking the plurality of additional clients based on at least one of: number of devices in the network in communication, number of devices outside of the network in communication, frequency of communications outside of the network, or volume of communications outside of the network; and selecting the second client from among the plurality of additional clients based on the ranking. The participating, by the sensor, in communications on the network by emulating a network address of the second client may include sending a communication to a destination in the external network, and the actions may further include: delaying the sending the communication to the destination in the external network until after the assessing that a second client in the network is actively communicating on the network. The actions may further include reevaluating automatically, subsequent to the determining, a network address of the router. A server may be connected to the external network, and the participating in communications on the network may include receiving, by the sensor, instructions sent to the network address of the client from the server via the network address of the router. The instructions may include a code update for the sensor. The participating in communications on the network may include monitoring data in transit on the network. A server may be connected to the external network, and the participating in communications on the network may further include sending the data from the network address of the client to the server via the network address of the router. The participating in communications on the network may include filtering content on the network. The participating in communications on the network may include modifying content in transit on the network. The participating in communications on the network may include inserting content in transit on the network. The actions may further include identifying an addressing scheme used by the network. The determining, automatically and by the sensor, the network address of the router, may include: determining that a packet originating in the network is addressed to a destination in the external network; and extracting a Media Access Control (MAC) address from the packet.

Combinations, (including multiple dependent combinations) of the above-described elements and those within the specification have been contemplated by the inventors and may be made, except where otherwise indicated or where contradictory.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to example implementations, illustrated in the accompanying drawings. Wherever convenient, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Some embodiments provide a device, e.g., a sensor, that can passively discover, identify, and assess a network. According to some embodiments, the device can be installed and can function where there is limited or zero prior knowledge of the network environment, communication protocols, or addressing schemes currently in use. According to some embodiments, the device can be installed by a complete novice or a person who has limited technical training. According to some embodiments, the device may be installed within an arbitrary communications network and participate in network communications with no prior knowledge of addressing schemes, directionality of the network topology, or prior knowledge of viable upstream routers, restrictive firewalls or any other condition that might otherwise impede its ability to communicate.

Once installed, the device (e.g., sensor) according to some embodiments can work in a continuously adaptive manner that self heals amidst changing network conditions.

According to some embodiments, the device's installation provides zero-configuration network communications capabilities. According to some embodiments, the device can conditionally participate or intervene in network communications. According to some embodiments, once installed, the device creates a communications link or plurality of communication links with a server or a plurality of servers outside of the network, which can be used for bi-direction communications activities, such as remote management, alerting, firmware/software/configuration updates, or other situations where moving data across a communications network is desired.

According to some embodiments, the device or sensor is non-destructive, e.g., it does not damage the network or necessarily restrict others' usage of the same network. According to some embodiments, the device can be installed inside (e.g., in-line) a communications network without any disruption of upstream or downstream communications whatsoever. According to some embodiments, the device can be installed without reducing or occupying any otherwise statically-assigned or ephemeral address on the network. According to some embodiments, the installed device does not interrupt or otherwise adversely affect the operation of the network, its speed, or its quality of service.

According to some embodiments, the device is Network Address Translator (NAT)-friendly, e.g., it is resilient to network address translation that may occur inside the network, modifying or further modifying network traffic at some point or at multiple points in the network. Such NAT translation does not prevent or obstruct the device from communicating.

According to some embodiments, the device is non-alerting, and its installation and usage can take place without presenting as a new component of a network. This capability is especially advantageous to, for example, detect and report network anomalies in inhospitable, hostile, or contested network environments, without alerting potential advanced threat actors that their network presence is known or being assessed. This is also advantageous in protecting a friendly or cooperative network, in that malicious actors are not alerted as to the presence of a device that is searching for or assessing threat risks or communicating for other purposes.

Additional advantages of some embodiments include that the device can be installed and used without requiring detailed network knowledge. Existing techniques for providing network access often require prior knowledge of the network in which they are operating, configuration to communicate and be a part of that network, and unique addressability in order to work properly. By contrast, some embodiments operate in a way that eliminates those requirements and instead automatically operate across a variety of communications networks with multiple varying underlying technology differences and characteristics.

Embodiments have many use cases. Some embodiments may be used to monitor, assess, and/or participate in a hostile or cooperative network. Some embodiments can be used to improve the reliability and usability of connected (networked) devices and make them simpler to introduce into an existing network without any prior knowledge of the network configuration, and without significant technical expertise. Some embodiments may be used to install an Internet of Things (IOT) device or similar low-profile, low-traffic device that does not necessarily need to be addressable on a Local Area Network (LAN), but that could utilize occasional external (WAN) network access in order to receive firmware or configuration updates, for example. Some embodiments can provide a way for ephemeral access to outside communications without requiring things like a DHCP server or for there be extra ports available on an Internet-accessible VLAN.

Other features and advantages are presented herein in reference to FIGS. 1-5.

Figure 1:
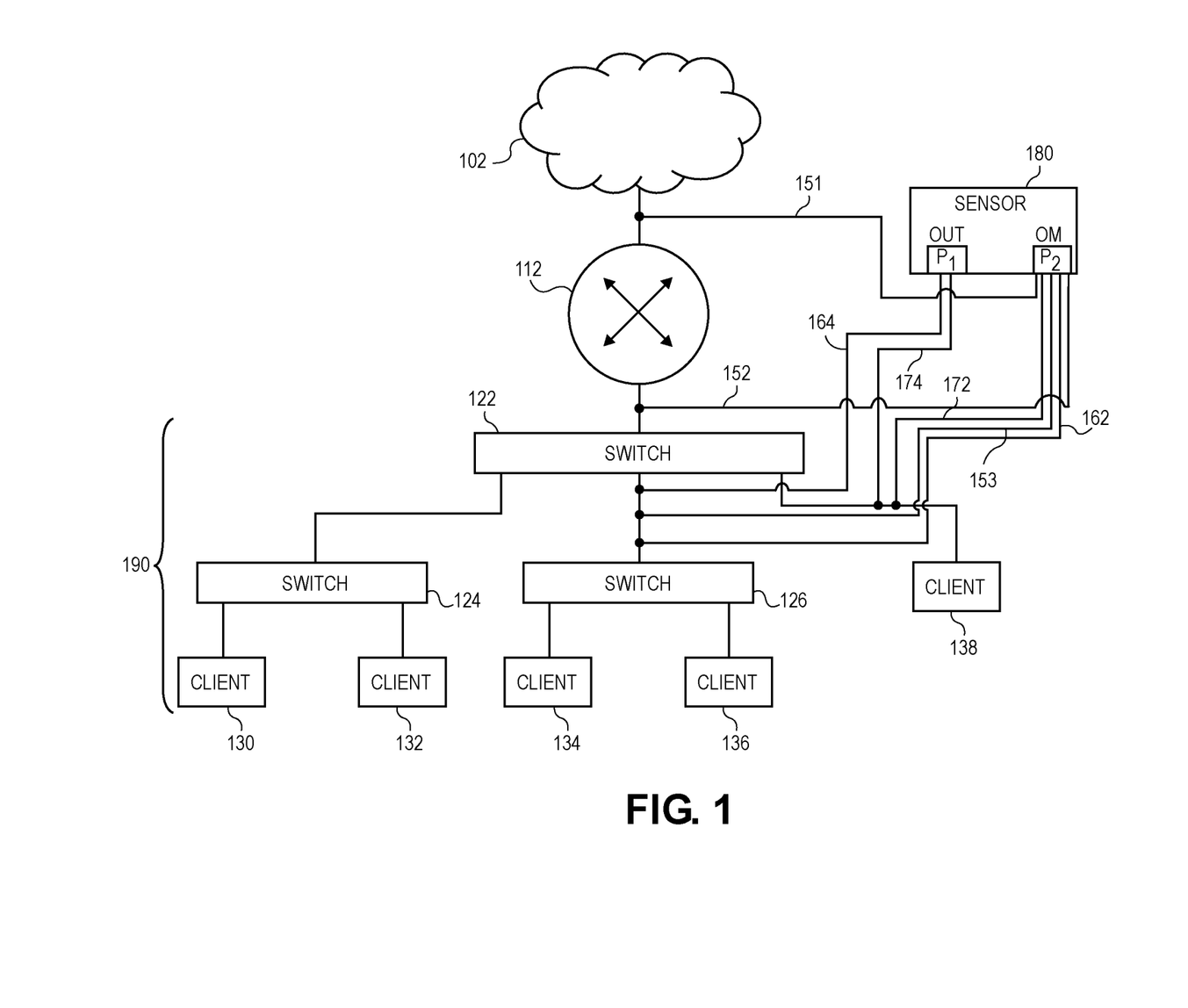
FIG. 1 illustrates a device for discovering a network with various alternative installation configurations according to various embodiments.

FIG. 1 illustrates a device 180 for discovering a network 190 with various alternative installation configurations 151, 152, 153, 162, 164, 172, 174 according to various embodiments. As shown, the network 190 includes switches 122, 124, and 126, as well as network clients 130, 132, 134, 136, and 138. Lines between network elements indicate communicative coupling. The elements and connections of the network 180 are non-limiting; other network elements and configurations are contemplated and possible. The network 190 may be an intranet, a private network, a local area network, or generally any network segment or the like. The network may utilize IPv4, IPv6, or any other protocol. In the example shown, the network 190 is communicatively coupled to an external network 102, such as the internet, by way of a router 112. More generally, any number of routers may couple the network 190 to the external network 102 and fall within the scope of network analysis according to various embodiments.

The device 180, which may also be referred to herein as a sensor 180, may be installed by physically establishing one or more wireline connections between the device 180 and the network 190. According to some embodiments, the installation may include configuring and connecting to a SPAN/Mirror port. According to some embodiments, the device 180 may be installed by inserting executable code into an existing network node, such as a switch 122, 124, or 126. The executable code configures the network node to perform actions of the device 180 as disclosed herein. In such embodiments, a separate physical device/sensor 180 is not used; instead, an existing network device, (e.g., such as the switch 122), performs the operations and functions of the device 180 according to the inserted executable code, as described herein. Despite the lack of an added or extra physical device/sensor 180, such embodiments are nonetheless considered to have a device/sensor 180 "installed" in the network 190.

The device 180 may be installed in the network 190 according to any of a variety of installation configurations, not limited to those illustrated in FIG. 1. In various embodiments, the device 180 may be a computerized network device, or the like, that includes a memory and a processor that executes software code. In some embodiments, the device 180 may include hardware that is the same as, or similar to, the hardware found in a switch, a router, a hub, a gateway, or the like. In various embodiments, the device 180 may include one or more ports for coupling to the network 190. As shown in FIG. 1, the device 180 includes a port for outbound communications and a port for inbound communications. However, according to various embodiments, a single port may be used for bi-directional communications, or more than two ports may be used. In general, the device 180 may be installed aside all or a part of the network 190, or may be installed in-line with all or part of the network 180. Further, the device 180 may be installed or configured to passively participate in network communications, or installed or configured to actively participate in network communications. In general, by way of non-limiting example, the aside installations may facilitate passive network communication participation, whereas the in-line installations may facilitate either passive or active network communication participation; however, either installation may be used for either active or passive network communication participation according to various embodiments.

The installation configurations by way of the alternative communicative couplings 151, 152, and 153 represent examples of installing the device 180 aside all or part of the network 190. Any of the communicative couplings 151, 152, or 153 may be used in the alternative. For aside installations, only one port, e.g., the inbound communication port, may be connected to the network. In particular, the communicative couplings 151 and 152 represent alternative aside installations with the entire network 190, whereas the communicative coupling 153 represents an alternative aside installation with a portion of the network 190, which includes the switch 126 and the clients 134, 136.

The installation configurations by way of the alternative pairs of couplings 162, 164 and 172, 174 represent examples of installing the device 180 in-line with all of part of the network 190. Either the pair of communicative couplings 162, 164 may be used, or the pair of communicative couplings 172, 174 may be used in the alternative. In general, for in-line installation, both ports may be connected to the network. As shown in FIG. 1, the pair of communicative couplings 162, 164 represent an in-line installation with the portion of the network 190 that includes the switch 126 and the clients 134 and 136, whereas the pair of communicative couplings 172, 174 represent an in-line installation with the portion of the network 190 that includes the client 138.

In various embodiments, the device 180 functions to accurately and automatically detect underlying network protocols, determine addressing schemes that are being used, and isolate the network address that corresponds to the upstream router 112 that is providing access to the external network 102. Once this information is known, the device 180 can use it to access the network 190 and send outbound communications to, and receive inbound communications from, a destination in the external network 102 via the router 112. For example, a connection, (such as a tunneled connection), can be made to a server in the external network 102 to facilitate additional configurations, code (e.g., software or firmware) updates, command and control, alerting, or reporting, among other things.

As a specific non-limiting example, the network 190 may be an IPv4 network using a private address scheme (e.g., per RFC1918). The device 180 may be used to gain access to the network 190, identify the addresses currently being used at each relevant layer of communications (Ethernet MAC, IPv4 address, TCP port numbers, etc.), detect the destination Ethernet MAC address of the upstream router 112, and direct traffic to a destination in the external network 102 via that address.

In general, as the device 180 operates, it may continually, or periodically, re-evaluate the addressing scheme being used, detect router changes, and determine a way to communicate on the network 190 that does not significantly affect (e.g., slow or obstruct) the other communications on the network 190. To communicate in an unaffecting and/or difficult-to-detect manner, the device 180 may emulate the address of another device on the network 190, e.g., the address of one of the clients 130, 132, 134, 136, or 138. The device 180 may adaptively determine and select the device it emulates (i.e., the device whose address it imitates or copies) by building a ranked list of devices on the network 190, as shown and described presently in reference to FIG. 2.

Figure 2:
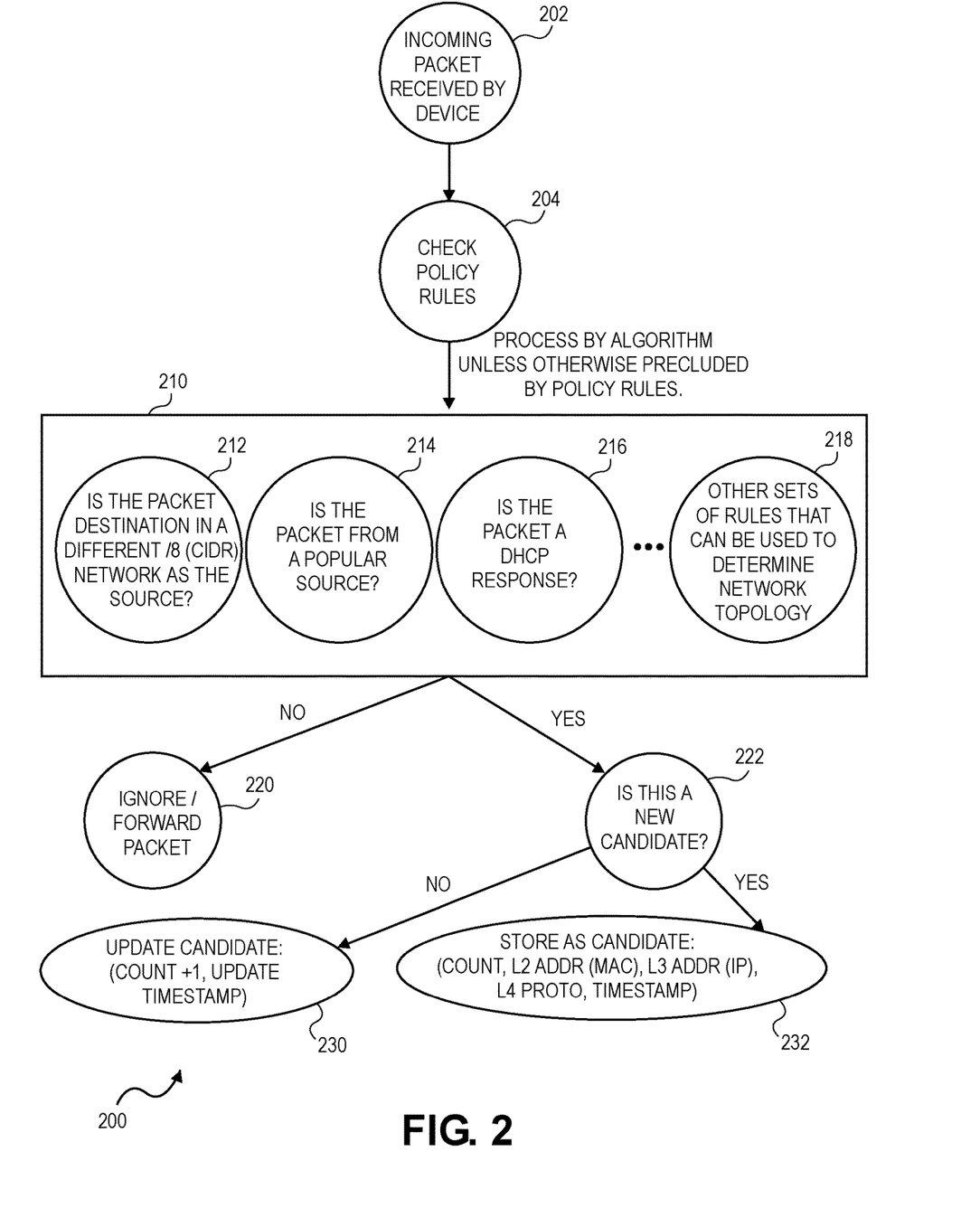
FIG. 2 is a flow chart for a method of updating a candidate list for address emulation according to various embodiments.

FIG. 2 is a flow chart for a method 200 of updating a candidate list for address emulation according to various embodiments. The method 200 may be implemented by a device, such as the device 180 as shown and described herein in reference to FIG. 1, to generate and maintain a candidate list for address emulation, as well as the identity of at least one router for the network. The method 200 may operate continuously or periodically. Once the list is generated, a candidate device may be selected for address emulation as disclosed herein.

At 202, the device (e.g., 180) receives a communications packet, e.g., a network packet, or the like. The packet may be received by way of any of a variety of techniques and in any of a variety of installations, e.g., in-line or aside. For example, for a device installed in-line on a network of interest (e.g., 190), such as, by way of non-limiting example, a network with a private RFC1918 IPv4 address space, the device may directly intercept packets. As another example, the device may be installed aside the network, with passive access to a copy of the network traffic (e.g., via SPAN/Mirror port or similar) and the ability to generate traffic on the network.

At 204, the device optionally checks policy rules with respect to the incoming packet. This optional operation includes checking whether the detected packet is a packet of interest at all. For example, the device may function to only detect and/or participate in communications to or from a particular specified device (e.g., client 138, switch 122, etc.) or address, or in a particular specified addressing scheme or protocol, and the policy rules may specify that packets outside of these parameters may be ignored (and if the device is installed inline, the ignored packet may be forwarded to its destination). As another example, the device may function to filter content sent from the network to a destination in an external network, and policy rules may be set to ignore packets that are not part of such filtering. As another example, the device may function ignore packets that are in IPv4, as opposed to IPv6 (or vice versa).

At 210, a set of filtering rules (e.g., 212, 214, 216, 218) is applied. In general, the device can use the received packet and filtering rules to detect, identify, or otherwise determine other network elements (e.g., network devices other than the sensor device 180), such as one or more clients (e.g., 130-138) and one or more routers (e.g., 112). The filtering rules may be disjunctive, such that if any of them applies, then control passes to 222, and the packet is represented in the candidate list; otherwise, if no filtering rule applies, then control passes to 220 and the packet is ignored or forwarded as appropriate for the installation.

FIG. 2 shows some non-limiting examples of rules. As shown, the first rule 212 may analyze the received packet to determine whether the packet destination address is in a different/8 CIDR network from that of the source address. In this example, a packet bound for an address in a different/8 network may be interpreted as being directed to a router; therefore, the process 200 may identify the destination MAC address of the packet as the address of a router (e.g., 212) in the network (e.g., 190). In various embodiments, the rule 212 allows the process 200 to identify, discover, or otherwise determine the router(s) in the network.

The second illustrated filtering rule 214 may analyze the received packet to determine whether the packet is from a popular source, e.g., as defined by a programmable list, which may include the source addresses of popular web sites and the like. Such popular sources may be, for example, web sites that have heavy traffic, such as news sources, mail servers, or search engines. In this example, the source address of a packet may be interpreted as being from outside of the network. In various embodiments, the rule 214 allows the process 200 to identify, discover, or otherwise determine the client(s) in the network.

The third illustrated filtering rule 216 may analyze the received packet to determine whether the packet is a DHCP response. If so, then the packet may be interpreted as having originated from a DHCP server in the network and as being sent to a client in the network, containing the correct routing information. In various embodiments, the rule 216 allows the process 200 to identify, discover, or otherwise determine the DHCP server(s) and the client(s) in the network. Other rules 218 may be applied in addition or in the alternative.

Thus, without having any prior information of a network, the device can use the rules to discover, assess, or determine network topology, client address(es), router address(es), etc. of the network. As a non-limiting example, the rules may be used to determine that the network is using, e.g., addresses in the 192.168.1.0/24 range and that the router is at 192.168.1.1. Based on the amount of traffic, it may also detect the most recent active IP addresses on the network segment are, e.g., 192.168.1.11 and 192.168.1.12.

At 220, if none of the rules of 210 apply, then the packet may be ignored. If the device is installed inline, the packet may be forwarded to its destination.

At 222, if at least one of the rules of 210 applies, then a determination is made as to whether the packet represents a new candidate—e.g., a network element/device that has not been detected or discovered previously by the process 200. The determination may be made, for example, by examining whether an identification regarding the packet is already on the list, If not, then control passes to 230; otherwise, if so, then control passes to 232.

At 232, when the packet represents a new candidate (e.g., is sent to or from the candidate), then information regarding the candidate is stored in a candidate list at the device. By way of non-limiting example, any, or any combination, of the following may be stored: a first identifier for the candidate network element, such as its layer two address, e.g., a MAC address; a second identifier for the candidate network element, such as its layer three address, e.g., an IP address; a count of packets sent to and/or sent from the candidate device; a layer four protocol; and/or a timestamp indicating when the most recent respective packet for the candidate was detected.

At 230, when the packet represents a candidate already represented in the list, then the entry for that candidate is updated in the list. By way of non-limiting example, any or both of the following updates may be made: the count of packets sent to and/or sent from the candidate device may be incremented, and/or the timestamp indicating when the most recent respective packet for the candidate may be updated.

Thus, in the example of FIG. 2, the method 200 operates to generate and continuously maintain a list of candidate networks elements, (e.g., a list of active clients 130-138) on the network whose stored information may be used for address emulation, and the list of candidate networks elements typically includes a router (e.g. 112) that connects the network to an external network. For example, any time a packet is received that the method 200 processes according to 230 or 232, the candidate list may be updated accordingly.

According to some embodiments, the candidate list may be regularly pruned of inactive network elements. By way of non-limiting example, the list may be pruned periodically, e.g., every ten seconds. At each pruning, network elements represented in the list may be removed if they have not communicated (at all) within a specified time period, or if they have not communicated specifically with a device or devices outside the network within a specified time period, e.g., since the previous pruning check, or for any other interval (e.g., 1, 2, 5, 10, 15, 20, 30, 60, 90, or more seconds).

In various embodiments, the device (e.g., sensor 180) may select a candidate from the candidate list to emulate its address as follows. In some embodiments, the device 180 may function to select the most active network element from the candidate list, where "most active" is determined based on the count of packets sent to and/or sent from the candidate network element. This selection technique may be desirable because, among other reasons, the communications sent/received by the device 180 are less noticeable and less impactful among the large number of communications sent/received by the most active network element, as compared to the less active network elements. As long as the network elements represented on the list remain active, the device 180 can select to emulate their address, e.g., their associated Ethernet MAC address, to send and receive data, e.g., by including (e.g. imitating or spoofing) such addresses as the origination addresses for packets sent by the device 180. If one of the network elements ceases actively communicating or otherwise reduces its level of participation on the network, the device 180 can then select a better (e.g., more active currently) candidate from the candidate list for address emulation. The selection may be based on a ranking, which may be implemented as follows.

According to some embodiments, the network elements represented on the candidate list may be ranked for desirability for emulation based on each's activity according to count-based or other criteria, which may be measured during a sliding temporal window, (e.g., a sliding one, two, three, five, seven, ten, 15, or 30 second window, or the like). By way of non-limiting examples, the network elements may be ranked according to any, or a combination, of: total packet count or message count for the candidate device, where a higher count increases the ranking; number of devices in the network in communication with the candidate device, where a higher number increases the ranking; number of devices outside of the network in communication with the candidate device, where a higher number increases the ranking; frequency of communications outside of the network with the candidate device, where a higher frequency increases the ranking; and/or volume of communications outside of the network with the candidate device, where a higher volume increases the ranking;. If ranked according to a plurality of criteria, the candidates may be ranked according to a first criteria, then for ties within that ranking, according to a second criteria, then for ties within than ranking, according to a third criteria, etc. For any given communication from the device, the candidate with the current highest ranking may be emulated. For communications between the device 180 and an external server or the like, e.g., as shown and described herein in reference to FIG. 4, the emulated address can dynamically change during such communications, e.g., according to changes in the rankings of the network elements in the list of candidates. Further, for such communications, the device 180 can provide the updated/current emulated address to the server, e.g., in encrypted or authenticated form.

As described herein in reference to FIG. 2, the candidate list includes router identifications (e.g., by way of one or more IP and/or MAC addresses). The device (e.g., sensor 180) may select a router from the candidate list to use for routing communications as follows. For the router selection, the device may select the most recent router that was detected and represented in the candidate list. Further, according to various embodiments, rather than, or in addition to, representing identified routers in the candidate list, a separate list of router candidates may be generated and maintained, e.g., populated and pruned as described herein in reference to FIG. 2. According to such embodiments, the device may select the most recent router that was detected and represented in the separate list of router candidates to use to route (e.g., send and/or receive) communications.

Figure 3:
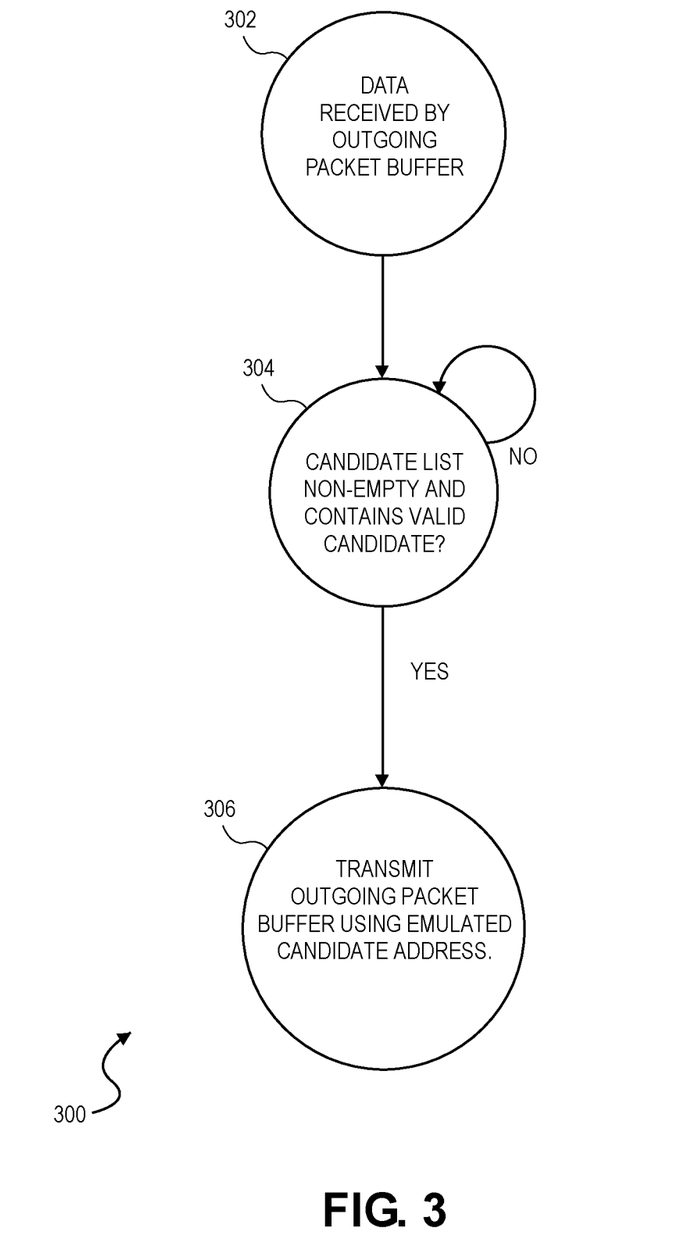
FIG. 3 is a flow chart for a method of sending data according to various embodiments.

FIG. 3 is a flow chart for a method 300 of sending data according to various embodiments. In particular, the method 300 may be used by a device, such as the device or sensor 180 as shown and described in reference to FIG. 1, to send data, whether within the network 190 or to a destination external to the network 190. Note that at any given time, the candidate list generated by the method 200 may be empty. Accordingly, at such times, the device may not have the source address of a network element to emulate. Therefore, in some embodiments, the data to be sent may be stored in a buffer of the device and sending it may be delayed until such time that the candidate list is populated with at least one suitable candidate.

At 302, the data to be sent is received at an outgoing packet buffer of the device. The outgoing packet buffer may be implemented using volatile memory hardware, for example. In some non-limiting examples, this data may include information that is collected and/or generated by the device 180, such as: information describing or regarding the elements/devices of the network 190; information describing or regarding the characteristics of the network 190; information describing or regarding the communications (e.g., messages, packets, bandwidth, etc.) on the network 190; information describing or regarding communications associated with malicious actors; information describing or regarding network anomalies, (e.g., which may be caused by malicious actors); and/or information describing or regarding the software or firmware of the device 180, among other things.

At 304, a determination is made as to whether the candidate list is non-empty and contains an entry that represents a valid candidate. If not, then control may pass back to 304, possibly after a predetermined time interval, e.g., in the range of 0.1 to 5.0 seconds. In various embodiments, during the predetermined time interval, the device 180 may be performing the process 200 of FIG. 2, which may add one or more candidates (e.g., network elements) to the list.

If there is at least one entry that represents a valid candidate on the candidate list, then control passes to 306.

At 306, the data is sent or transmitted in a packet or the like, with the source address of the packet emulated to match that of a candidate represented in the candidate list and selected, for example, according to each candidate's ranking as described above. In such embodiments, the transmitted packet therefore appears to come from the selected network element candidate, and not from the device 180 that actually transmitted it, because the source address of the packet is the same as the source address of the selected network element. For example, with brief reference to FIG. 1, the transmitted packet may appear to come from the client 138, and not from the sensor 180 that actually transmitted it, because the sensor 180 placed the source address of the client 138 into the "source address" field of the packet before transmitting it.

Figure 4:
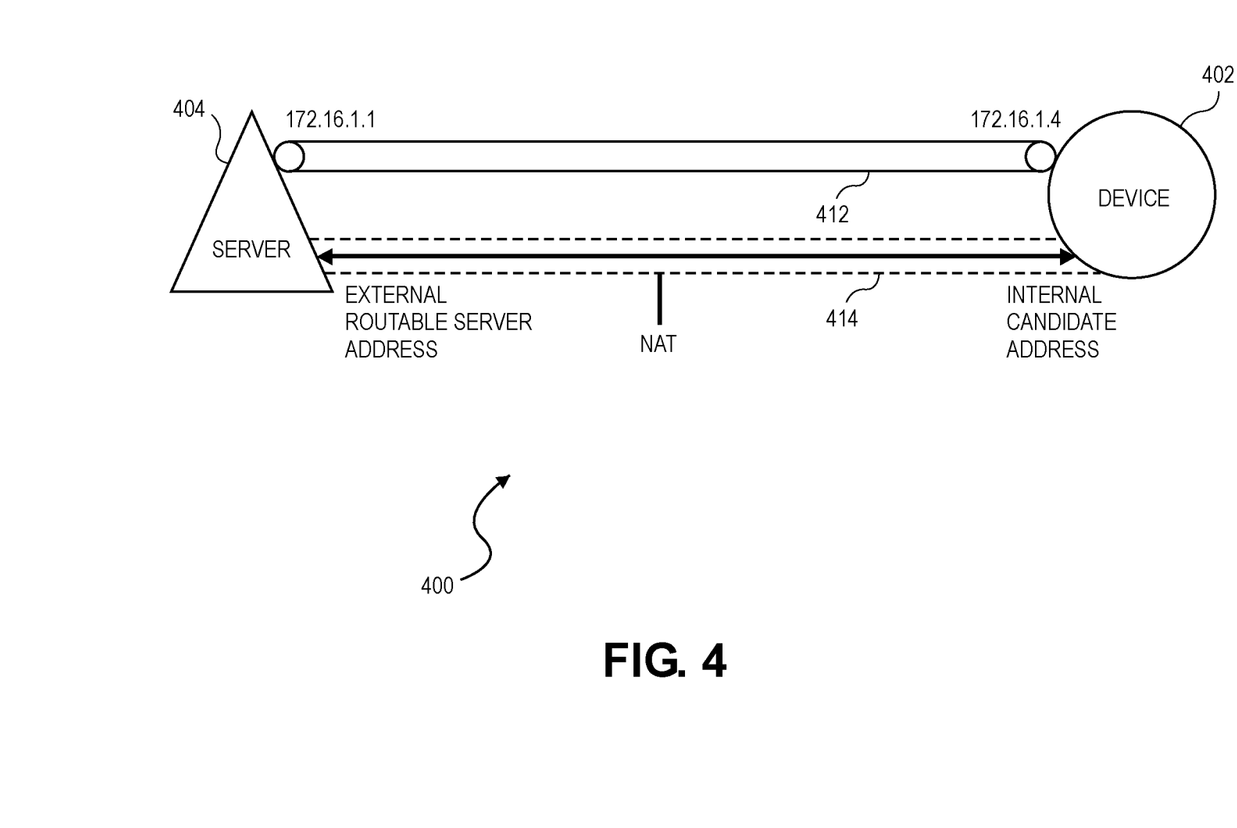
FIG. 4 is a diagram of a bi-directional communication channel according to various embodiments.

FIG. 4 is a diagram 400 of a bi-directional communication channel 414 according to various embodiments. The communication channel 414 is shown as being between a server 404 and a device 402, such as the device or sensor 180 of FIG. 1. The device 402 may be in a network such as the network 190 of FIG. 1, and the server 404 may be in an external network, such as the external network 102. Any number of intermediate devices may be between the server 404 and the device 402, such as the shown network address translation (NAT) device. The communication channel 414 may be maintained using the address for the server 404, which may be known (e.g., stored) by the device 402 as an IP address or a domain name, e.g., from a list of IP addresses or domain names, (which list may be coded), and using the address of a network element (e.g. a client) on the network of the device 402 as emulated by the device 402. Either or both addresses may be updated dynamically during any particular communication session or between communication sessions. For example, the address of the device 402 may be updated as shown and described in reference to FIG. 2, and the device 402 may communicate its updated address to the server 404 upon changing its emulated address. The communication channel 414 may be used to send data from the server 404 to the device 402, such as instructions, configuration information, code (e.g., software or firmware) updates, and/or command and control data. The communication channel 414 may be used to send data from the device 402 to the server 404, such as alerting data, reporting data, and/or data about or acquired from the communications within the network of the device 402, among others.

The communication channel 414 may be encrypted, so as to provide a tunneled connection 412. Any of a variety of encryption protocols may be used at any of a variety of layers. According to some embodiments, secure sockets layer (SSL), transport layer security (TLS), or direct encryption at any protocol layer, e.g., using symmetric encryption, asymmetric encryption, and/or hybrid encryption.

For any communication sent from the server 404 to the device 402 over the communication channel 414, if the device 402 is installed in-line between a router at the network gateway and the network element, e.g., network client, whose address the device 402 is emulating, the device 402 may prevent the server 404's communication from reaching the network client by intercepting it and not passing it through. However, the device 402 may pass through communications that are intended for the client rather than for the device 402.

Figure 5:
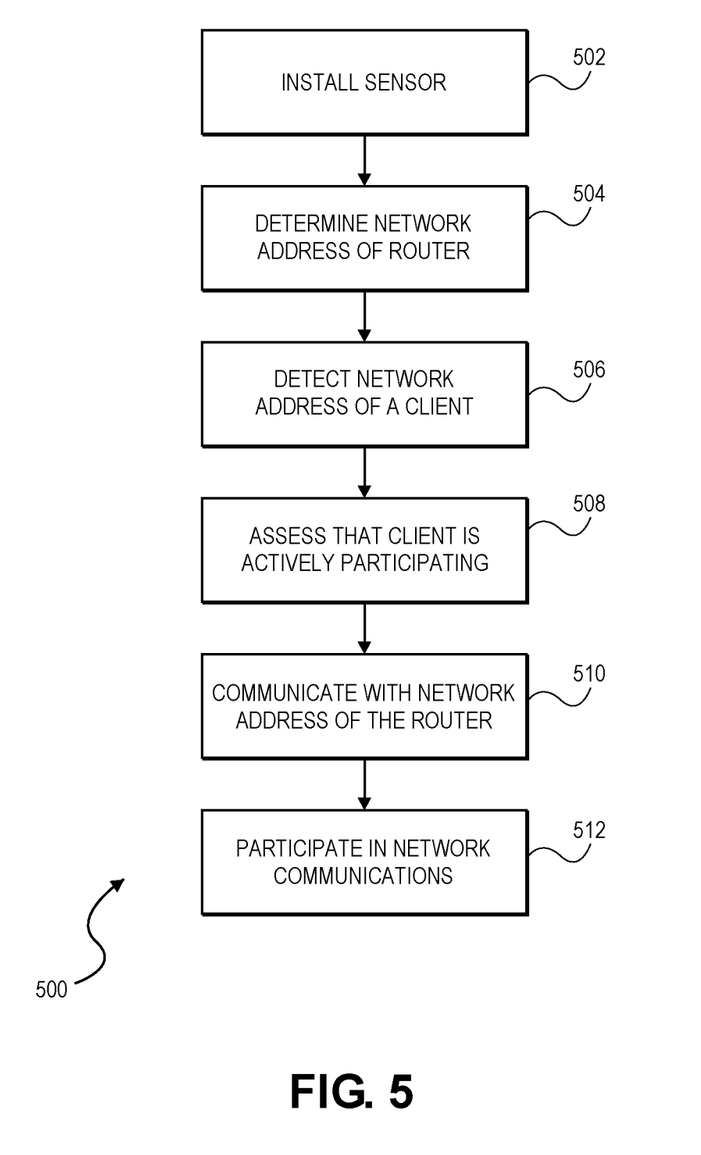
FIG. 5 is a flow chart for a method of discovering a network according to various embodiments.

FIG. 5 is a flow chart for a method 500 of discovering a network according to various embodiments. The method may be implemented in a context such as is shown and described herein in reference to FIG. 1, for example, by a device such as the device or sensor 180.

At 502, the method 500 optionally includes installing a sensor, such as the device 180 of FIG. 1, in a network, such as the network 190 of FIG. 1. The sensor may be installed aside or in-line as disclosed herein. The network may be communicatively coupled to an external network (e.g. 102), such as the internet, by one or more routers (e.g. 112). In some embodiments, the functionality and/or operations of the sensor 180, as described herein, may be optionally installed in or added to an existing network element (e.g., to a client 130-138, to a switch 122-126, etc.); for example such functionality may be installed by downloading or otherwise modifying the software and/or firmware that is run by an existing network element.

At 504, the method 500 includes determining, e.g., automatically and by the sensor 180, a network address of a router (e.g., 112) of the network (e.g., 190). The network address of the router may be determined using the techniques shown and described herein in reference to FIGS. 1 and 2, for example.

At 506, the method 500 includes detecting, e.g., automatically and by the sensor, the network address of a client in the network. The network address of the client may be detected using the techniques shown and described herein in reference to FIGS. 1 and 2, for example.

At 508, the method 500 includes assessing, e.g., automatically and by the sensor, that the client in the network is actively communicating on the network. Whether the client is actively communicating on the network may be assessed using the techniques shown and described herein in reference to FIG. 2, for example.

At 510, the method 500 includes communicating, by the sensor, with the network address of the router. The sensor may communicate on the network by utilizing the address of the router with any of a variety of protocols, e.g., the MAC sublayer of the data link layer.

At 512, the method 500 includes participating, by the sensor, in communications on the network, which may include emulating the network address of a network element, such as a client, and using the network address of the router. For example, the sensor may acquire communications from the router using the network address of the router, e.g., by sending an acknowledgement packet to the router's address using the address of the emulated client as the packet's origination address. According to various embodiments, the sensor may actively or passively participate in communications on the network.

An example of passively participating in communications on the network includes monitoring communications on the network. According to this example, the device 180 may acquire any network communications that it has access to, which may depend upon its installation configuration. For example, the device 180 may acquire, analyze, and/or store, and also pass through such communications if the device 180 is installed in-line, which allows the device 180 to produce, report, and/or send information about such communications, (e.g., to an external server), without disrupting communications on the network.

Another example of passively participating in communications on the network includes the device 180 receiving communications from a server that is on an external network (e.g. 102). Such communications may include, for example, instructions, configuration information, code updates, and/or command and control data.

An example of actively participating in communications on the network includes sending data, such as data acquired or produced from passively monitoring network communications, to an external server or the like.

Another example of actively participating in communications on the network includes filtering content on the network. According to this example, a device 180 installed in-line between, for example, a client and a router for the network can intercept, without passing through, communications from the external network to the client and/or communications from the client to the external network. Any or all such communications can be filtered. Communications can be filtered based on origination, destination, and/or content.

Yet another example of actively participating in communications on the network includes modifying content on the network. According to this example, a device 180 installed in-line between a client and a router for the network can intercept, modify, and pass on communications from the external network to the client and/or communications from the client to the external network. Modifications include changing origination identifications, destination identifications, and/or payload data. Any or all such communications can be modified. Communications can be modified based on origination, destination, and/or content.

Yet another example of actively participating in communications on the network includes inserting content on the network. According to this example, a device 180 can send communications to any downstream network element, e.g., client, to a router, or to any upstream element or device, e.g., an element in an external network. The communications can utilize an emulated address of a client on the network, as disclosed in detail herein, for an origination address. Any type of content may be inserted, including, for example, excessive content intended to drown out other communications.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

As used herein, the terms "A or B" and "A and/or B" are intended to encompass A, B, or {A and B}. Further, the terms "A, B, or C" and "A, B, and/or C" are intended to encompass single items, pairs of items, or all items, that is, all of: A, B, C, {A and B}, {A and C}, {B and C}, and {A and B and C}. The term "or" as used herein means "and/or."

As used herein, language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," is intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of discovering a network using a sensor installed in the network, wherein the network is communicatively coupled to an external network by a router, the method comprising:
   determining, automatically and by the sensor, a network address of the router;
   detecting, automatically and by the sensor, a network address of a client in the network;
   assessing, automatically and by the sensor, that the client in the network is actively communicating on the network;
   communicating, by the sensor, with the network address of the router; and
   participating, by the sensor, in communications on the network by emulating the network address of the client and by using the network address of the router, wherein a server is connected to the external network, and wherein the participating comprises at least one of: (i) receiving, by the sensor, instructions sent to the network address of the client from the server via the network address of the router, or (ii) monitoring data in transit on the network and sending the data from the network address of the client to the server via the network address of the router.

2. The method of claim 1, wherein the sensor is installed in-line with the router.

3. The method of claim 1, further comprising:
   reevaluating automatically, subsequent to the determining, a network address of the router.

4. The method of claim 1, wherein the instructions comprise a code update for the sensor.

5. The method of claim 1, wherein the participating in communications on the network comprises filtering content on the network.

6. The method of claim 1, wherein the participating in communications on the network comprises modifying content in transit on the network.

7. The method of claim 1, wherein the participating in communications on the network comprises inserting content in transit on the network.

8. The method of claim 1, further comprising identifying an addressing scheme used by the network.

9. The method of claim 1, wherein the determining, automatically and by the sensor, the network address of the router, comprises:
   determining that a packet originating in the network is addressed to a destination in the external network; and
   extracting a Media Access Control (MAC) address from the packet.

10. A sensor for discovering a network when installed in the network, wherein the network is communicatively coupled to an external network by a router, the sensor comprising an electronic processor and non-transitory persistent storage including instructions that, when executed by the processor, cause the sensor to perform actions comprising:
   determining, automatically and by the sensor, a network address of the router;
   detecting, automatically and by the sensor, a network address of a client in the network;

assessing, automatically and by the sensor, that the client in the network is actively communicating on the network;

communicating, by the sensor, with the network address of the router; and participating, by the sensor, in communications on the network by emulating the network address of the client and by using the network address of the router, wherein a server is connected to the external network, and wherein the participating comprises at least one of: (i) receiving, by the sensor, instructions sent to the network address of the client from the server via the network address of the router, or (ii) monitoring data in transit on the network and sending the data from the network address of the client to the server via the network address of the router.

11. The sensor of claim 10, wherein the sensor is installed in-line with the router.

12. The sensor of claim 10, wherein the actions further comprise:
reevaluating automatically, subsequent to the determining, a network address of the router.

13. The sensor of claim 10, wherein the instructions comprise a code update for the sensor.

14. The sensor of claim 10, wherein the participating in communications on the network comprises filtering content on the network.

15. The sensor of claim 10, wherein the participating in communications on the network comprises modifying content in transit on the network.

16. The sensor of claim 10, wherein the participating in communications on the network comprises inserting content in transit on the network.

17. The sensor of claim 10, wherein the actions further comprise identifying an addressing scheme used by the network.

18. The sensor of claim 10, wherein the determining, automatically and by the sensor, the network address of the router, comprises:
determining that a packet originating in the network is addressed to a destination in the external network; and
extracting a Media Access Control (MAC) address from the packet.

19. A method of discovering a network using a sensor installed in the network, wherein the network is communicatively coupled to an external network by a router, the method comprising:
determining, automatically and by the sensor, a network address of the router;
detecting, automatically and by the sensor, a network address of a client in the network;
assessing, automatically and by the sensor, that the client in the network is actively communicating on the network;
communicating, by the sensor, with the network address of the router;
participating, by the sensor, in communications on the network by emulating the network address of the client and by using the network address of the router;
reassessing automatically, subsequent to the assessing, whether the client in the network is actively communicating on the network, wherein the reassessing comprises determining that the client in the network is no longer actively communicating on the network;
assessing that a second client in the network is actively communicating on the network; and
participating, by the sensor, in communications on the network by emulating a network address of the second client.

20. The method of claim 19, further comprising:
assessing that a plurality of additional clients in the network are actively communicating on the network, wherein the plurality of additional clients comprises the second client;
ranking the plurality of additional clients based on at least one of: number of devices in the network in communication, number of devices outside of the network in communication, frequency of communications outside of the network, or volume of communications outside of the network; and
selecting the second client from among the plurality of additional clients based on the ranking.

21. The method of claim 19, wherein the participating, by the sensor, in communications on the network by emulating a network address of the second client comprises sending a communication to a destination in the external network, the method further comprising:
delaying the sending the communication to the destination in the external network until after the assessing that a second client in the network is actively communicating on the network.

22. A sensor for discovering a network when installed in the network, wherein the network is communicatively coupled to an external network by a router, the sensor comprising an electronic processor and non-transitory persistent storage including instructions that, when executed by the processor, cause the sensor to perform actions comprising:
determining, automatically and by the sensor, a network address of the router;
detecting, automatically and by the sensor, a network address of a client in the network;
assessing, automatically and by the sensor, that the client in the network is actively communicating on the network;
communicating, by the sensor, with the network address of the router;
participating, by the sensor, in communications on the network by emulating the network address of the client and by using the network address of the router;
reassessing automatically, subsequent to the assessing, whether the client in the network is actively communicating on the network, wherein the reassessing comprises determining that the client in the network is no longer actively communicating on the network;
assessing that a second client in the network is actively communicating on the network; and
participating, by the sensor, in communications on the network by emulating a network address of the second client.

23. The sensor of claim 22, wherein the actions further comprise:
assessing that a plurality of additional clients in the network are actively communicating on the network, wherein the plurality of additional clients comprises the second client;
ranking the plurality of additional clients based on at least one of: number of devices in the network in communication, number of devices outside of the network in communication, frequency of communications outside of the network, or volume of communications outside of the network; and selecting the second client from among the plurality of additional clients based on the ranking.

24. The sensor of claim 22, wherein the participating, by the sensor, in communications on the network by emulating a network address of the second client comprises sending a communication to a destination in the external network, wherein the actions further comprise:

delaying the sending the communication to the destination in the external network until after the assessing that a second client in the network is actively communicating on the network.

* * * * *